(12) United States Patent
Drinan

(10) Patent No.: US 7,267,370 B2
(45) Date of Patent: Sep. 11, 2007

(54) FREQUENCY AND STIFFNESS ENHANCEMENT MECHANIZATION

(75) Inventor: Thomas H. Drinan, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 361 days.

(21) Appl. No.: 11/078,215

(22) Filed: Mar. 11, 2005

(65) Prior Publication Data

US 2005/0212280 A1  Sep. 29, 2005

Related U.S. Application Data

(60) Provisional application No. 60/552,223, filed on Mar. 11, 2004.

(51) Int. Cl.
*B62D 1/18* (2006.01)
(52) U.S. Cl. .......................................... 280/775; 74/493
(58) Field of Classification Search ................ 280/775, 280/779, 780, 777; 74/491, 492, 493
See application file for complete search history.

(56) References Cited

U.S. PATENT DOCUMENTS

| | | | | |
|---|---|---|---|---|
| 4,774,851 A | * | 10/1988 | Iwanami et al. ............... 74/493 |
| 4,915,412 A | * | 4/1990 | Yuzuriha et al. ............. 280/775 |
| 5,025,679 A | * | 6/1991 | Yamamoto .................... 74/493 |
| 5,580,184 A | * | 12/1996 | Riccitelli .................... 403/365 |
| 6,139,057 A | * | 10/2000 | Olgren et al. ............... 280/775 |
| 6,349,967 B1 | * | 2/2002 | Cartwright ................... 280/775 |
| 6,508,142 B1 | * | 1/2003 | Nigrin .......................... 74/552 |
| 6,623,036 B2 | * | 9/2003 | Yamamura et al. ......... 280/775 |
| 6,799,779 B2 | * | 10/2004 | Shibayama ................. 280/777 |
| 7,044,503 B2 | * | 5/2006 | Murakami et al. .......... 280/775 |
| 7,066,679 B2 | * | 6/2006 | Audibert et al. ............ 403/355 |
| 7,093,855 B2 | * | 8/2006 | Manwaring et al. ........ 280/775 |

* cited by examiner

*Primary Examiner*—Paul N. Dickson
*Assistant Examiner*—Toan C. To
(74) *Attorney, Agent, or Firm*—Michael D. Smith

(57) ABSTRACT

The invention provides a steering column for a vehicle. The steering column includes an outer member having a first portion and a clamping portion cantilevered from the first portion. The clamping portion includes first and second projections and a first aperture defined between the first and second projections. The steering column also includes an inner member received in the first aperture for telescoping movement relative to the outer member along an axis. The steering column also includes a clamping mechanism disposed to selectively urge the first and second projections closer to one another to change a size of the first aperture. The first aperture is relatively smaller when the first and second projections have been urged relatively closer together by the clamping mechanism to lock the inner and outer members relative to one another. The first aperture is relatively larger when the first and second projections have been released with respect to the clamping mechanism such that the inner and outer members are movable relative to one another. The steering column also includes a linking member fixedly engaged with the first portion and one of the first and second projections to increase a stiffness of the steering column.

9 Claims, 1 Drawing Sheet

FREQUENCY AND STIFFNESS ENHANCEMENT MECHANIZATION

CROSS-REFERENCE TO RELATED APPLICATION

This application claims the benefit of U.S. Provisional Patent Application Ser. No. 60/552,223 for a FREQUENCY AND STIFFNESS ENHANCEMENT MECHANIZATION, filed on Mar. 11, 2004, which is hereby incorporated by reference in its entirety.

FIELD OF THE INVENTION

The invention to relates to a steering column for a vehicle and more specifically the invention relates to increasing the stiffness of the steering column.

BACKGROUND OF THE INVENTION

In vehicle steering columns, the natural frequency and the stiffness of the column are significant contributors to the pleasability of the vehicle relative to the interface between the driver and the steering wheel. To maximize this pleasability, a very high natural frequency and stiffness is required of the steering column to minimize shake and the transmission of vibrations. As a result, the driver is presented with a feel of solidness, sturdiness, preciseness, quality, confidence, and control. These qualities are not only attributed to the steering column, but also, and more importantly, attributed to the entire vehicle. Thus, specifications and requirements for the steering column continue to increase.

Traditionally, enhancements of the steering column have been accomplished by increasing the size, the cross-section, the moment of inertia, or the materials of the steering column. The challenge of improving the steering column is exacerbated by the fact that the demand for ever-increasing driver adjustability of the steering column, including a telescoping feature, often in combination with a toping or pivoting feature, inherently reduces the natural frequency of the column as well as the stiffness of the column. These traditional approaches result in added costs, size, bulk, weight of a column and can also result in a negative impact on packaging and performance in the number of applications.

SUMMARY OF THE INVENTION AND ADVANTAGES

The present invention provides a method and apparatus for increasing the natural frequency and stiffness of a steering column for a vehicle. The steering column includes an inner member and an outer member engaged with respect to one another for telescoping movement. The outer member defines a clamping portion that is selectively engaged to compress the inner member and prevent the telescoping movement. The outer member also includes a first portion and an intermediate portion, wherein the intermediate portion is disposed between the first portion and the clamping portion. The intermediate portion of the outer member is smaller than the first portion and smaller than the clamping portion. The invention provides a plate that is connected to the clamping portion and to the first portion. The plate extends substantially parallel to the intermediate portion.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
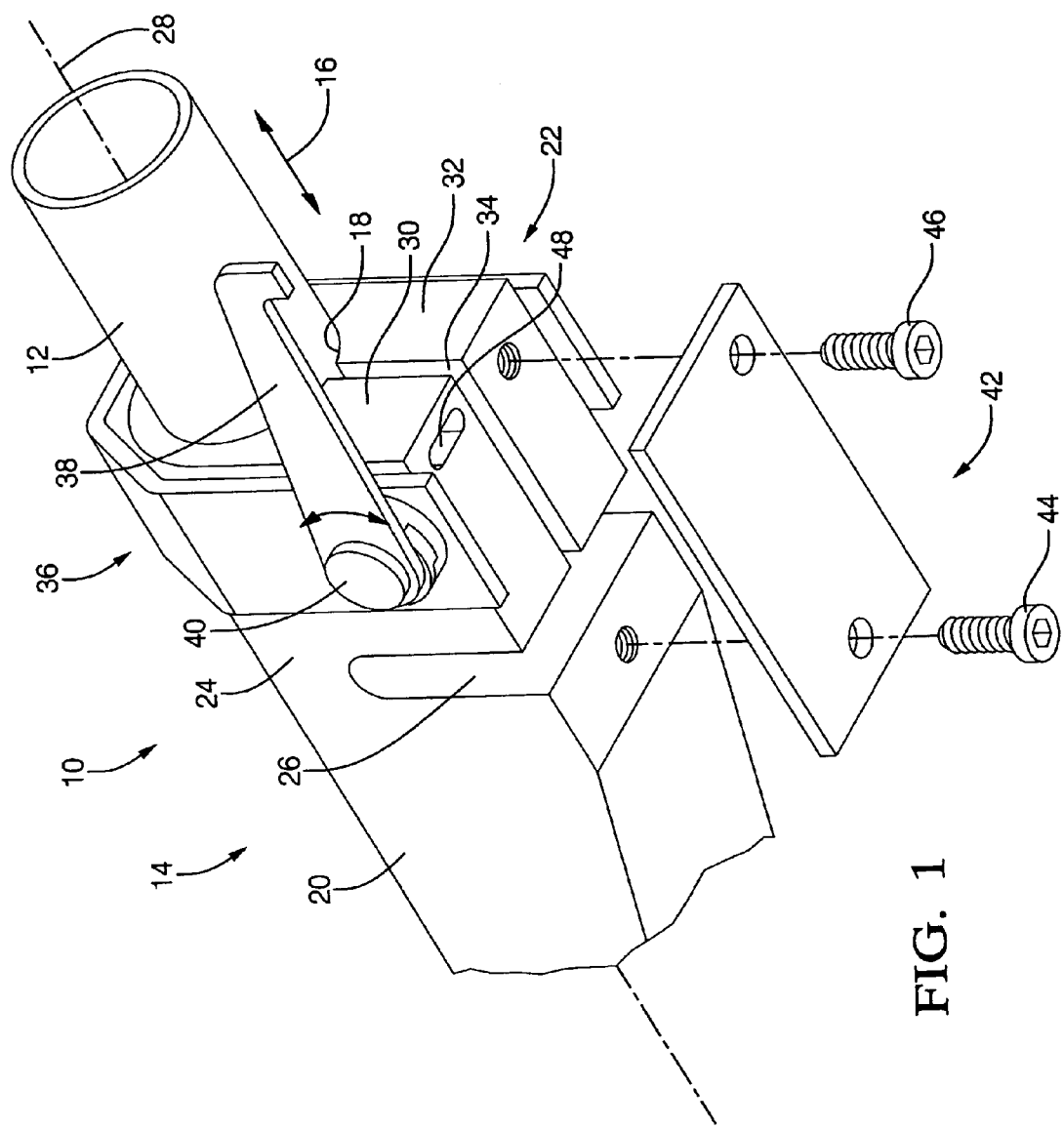
FIG. 1 is an exploded view of the exemplary embodiment of the invention.

Referring now to FIG. 1, a steering column includes an inner member and an outer member engaged with respect to one another for telescoping movement. The inner member supports a steering wheel in a vehicle and is received in an aperture defined by the outer member. The outer member is attachable to the vehicle.

The outer member includes a first portion, a clamping portion, and an intermediate portion. The intermediate portion is disposed between the first portion and the clamping portion. The intermediate portion is smaller than the first portion and smaller than the clamping portion. A notch is defined between the first portion and the clamping portion, adjacent to the intermediate portion. The notch extends transverse to the longitudinal axis of the steering column and communicates with the aperture.

The clamping portion includes a first projection and a second projection. A notch is defined between the first and second projections and communicates with the aperture. The notch also communicates with the notch.

The steering column also includes a clamping mechanism to urge the first and second projections closer to one another. The clamping mechanism includes a lever arm that rotates about a pin in a known manner to move the first and second projections together, narrowing the notch and producing a compressive load on the inner member.

The invention provides a linking member connected to the first portion and to the clamping portion. The linking member bridges the notch and extends parallel to the intermediate portion. The linking member can be formed from any material. Preferably, the material for forming the linking member has a relatively high modulus of elasticity. The linking member is configured to maximize the contact area between the linking member and the first portion and also to maximize the contact area between the plate and the clamping portion. The linking member can be connected to the outer member with fasteners, such as bolts, or can be connected with a fastener-less methodology such as welding or adhesive. In the exemplary embodiment of the invention, the linking member is a plate.

In the exemplary embodiment of the invention, the linking member is connected to the second projection with the bolt. The linking member can also be attached to the first projection. The first projection defines a slot for receiving a fastener. A fastener such as a pin or bolt can be integrally formed with and extend from the linking member to engage the slot. Alternatively, the linking member could form an aperture and a pin or bolt could extend through the aperture and engage the slot. The slot extends in parallel to the movement of the first and second projections relative to one another to accommodate the clamping movement.

The linking member limits relative motion between the first portion and the clamping portion. The natural frequency of the steering column can be increased 25% or more, depending on the operating environment, with the addition of the linking member. The enhanced performance can be estimated by comparing the section modulus of the column with and without the linking member. The addition of the linking member to the outer member increases the section modulus of the outer member by changing the centroidal moment of inertia. The performance improvement results from the fact that a beam with a larger section modulus is more effective at resisting bending.

In the exemplary embodiment of the invention, the notch is defined between a first portion and a clamping portion. However, it should be appreciated that the linking member can be used to bridge any gap or notch defined by an inner or outer steering column member extending perpendicular to the axis of the column.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering column comprising:
    an outer member having a first portion and a clamping portion cantilevered from said first portion wherein said clamping portion includes first and second projections and a first aperture defined between said first and second projections;
    an inner member received in said first aperture for telescoping movement relative to said outer member along an axis;
    a clamping mechanism disposed to selectively urge said first and second projections closer to one another to change a size of said first aperture wherein said first aperture is relatively smaller when said first and second projections have been urged relatively closer together by said clamping mechanism to lock said inner and outer members relative to one another and is relatively larger when said first and second projections have been released with respect to said clamping mechanism such that said inner and outer members are movable relative to one another; and
    a linking member fixedly engaged with said first portion and one of said first and second projections to increase a stiffness of said steering column.

2. The steering column of claim 1 wherein said linking member is a plate.

3. The steering column of claim 1 wherein said linking member is releasably engaged with at least one of said first portion and said one of said first and second projections.

4. The steering column of claim 3 wherein said linking member is releasably engaged with both of said first portion and said one of said first and second projections.

5. The steering column of claim 1 wherein said linking member is further defined as being fixedly engaged with said first portion and said second projection and as being slidably engaged with said first projection.

6. The steering column of claim 5 wherein said first projection includes a slot open to said linking member for receiving a fastener.

7. The steering column of claim 6 wherein said outer member is further defined as having a first notch defined between said first portion and said clamping portion, wherein said first notch communicates with said first aperture.

8. The steering column of claim 7 wherein said outer member is further defined as having a second notch disposed between said first and second projections, wherein said second notch communicates with said first aperture and said first notch.

9. The steering column of claim 1 wherein said linking member is further defined as being fixedly engaged with said first portion and said second projection and wherein said clamping mechanism further comprises a lever arm mounted for pivoting movement on said first projection.

* * * * *